United States Patent
Apfel

(10) Patent No.: US 11,746,260 B2
(45) Date of Patent: Sep. 5, 2023

(54) INDUCTION ACTIVATED ADHESIVES AND SEALANTS

(71) Applicant: Zephyros, Inc., Romeo, MI (US)

(72) Inventor: Jeff Apfel, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 455 days.

(21) Appl. No.: 16/758,997

(22) PCT Filed: Nov. 2, 2018

(86) PCT No.: PCT/US2018/058946
§ 371 (c)(1),
(2) Date: Apr. 24, 2020

(87) PCT Pub. No.: WO2019/090067
PCT Pub. Date: May 9, 2019

(65) Prior Publication Data
US 2020/0339841 A1    Oct. 29, 2020

Related U.S. Application Data

(60) Provisional application No. 62/580,474, filed on Nov. 2, 2017.

(51) Int. Cl.
| | | |
|---|---|---|
| *C09J 7/35* | (2018.01) | |
| *C08F 220/18* | (2006.01) | |
| *C08F 236/22* | (2006.01) | |
| *C08K 3/08* | (2006.01) | |
| *C08K 3/22* | (2006.01) | |
| *C08K 5/01* | (2006.01) | |
| *C08K 5/14* | (2006.01) | |
| *C09J 123/08* | (2006.01) | |
| *C09J 131/04* | (2006.01) | |
| *C09J 133/08* | (2006.01) | |

(52) U.S. Cl.
CPC .......... *C09J 7/35* (2018.01); *C08F 220/1804* (2020.02); *C08F 236/22* (2013.01); *C08K 3/08* (2013.01); *C08K 3/22* (2013.01); *C08K 5/01* (2013.01); *C08K 5/14* (2013.01); *C09J 123/08* (2013.01); *C09J 131/04* (2013.01); *C09J 133/08* (2013.01); *C08K 2003/0856* (2013.01); *C08K 2003/2296* (2013.01); *C08K 2201/003* (2013.01); *C09J 2301/414* (2020.08); *C09J 2400/16* (2013.01)

(58) Field of Classification Search
None
See application file for complete search history.

(56) References Cited

U.S. PATENT DOCUMENTS

| | | | | |
|---|---|---|---|---|
| 2002/0061968 | A1* | 5/2002 | Yoshihara | ................ C09J 11/04 |
| | | | | 156/275.7 |
| 2019/0292418 | A1* | 9/2019 | Xiang | ................ H01L 31/0512 |
| 2019/0338142 | A1* | 11/2019 | Hartmann-Thompson | ................ |
| | | | | H01L 51/5275 |

FOREIGN PATENT DOCUMENTS

| | | |
|---|---|---|
| CN | 103597551 A | 2/2014 |
| JP | H0345683 A | 2/1991 |
| JP | H03137179 A | 6/1991 |
| JP | 2016003306 A | 1/2016 |
| JP | 2017193717 A | 10/2017 |
| WO | 2012/164925 A1 | 12/2012 |
| WO | WO 2016/079288 | * 5/2016 |

OTHER PUBLICATIONS

Machine translation of Nishiyama et al. (WO 2012164925). (Year: 2012).*
Chinese First Office Action dated Sep. 24, 2021, Application No. 201880071468.6.
PCT Search Report & Written Opinion dated Feb. 11, 2019, Application No. PCT/US2018/058946, Filed Nov. 2, 2018.
Chinese Notification of the Second Office Action dated Apr. 15, 2022, Application No. 201880071468.6.

* cited by examiner

*Primary Examiner* — Robert T Butcher
(74) *Attorney, Agent, or Firm* — The Dobrusin Law Firm, PC

(57) ABSTRACT

An adhesive/sealant material for induction heating including copolymer of ethylene and butyl acrylate and a metallic filler. The metallic filler may be present in an amount of at least about 30% by weight of the adhesive/sealant material.

20 Claims, No Drawings

INDUCTION ACTIVATED ADHESIVES AND SEALANTS

This application is related to and claims the benefit of the filing date of U.S. Provisional Application Ser. No. 62/580,474, filed Nov. 2, 2018, the contents of that application being hereby incorporated by reference herein for all purposes.

FIELD

The present invention relates generally to adhesive/sealant material including metallic filler for induction heating.

BACKGROUND

There has been an increased use of polymeric materials in the automotive industry due efforts to reduce vehicle weight. Adhesion between two polymeric substrates and/or a polymeric substrate and a second dissimilar substrate may pose challenges related to timing of adhering and curing. For example, heat activated adhesives may be utilized in multiple locations throughout the vehicles and are formulated to adhere and cure during exposure to temperatures in a paint bake oven. However, there are a number of locations within a vehicle where the adhesive must adhere and/or cure outside of the paint bake cycle. Also, there may be situations in which a fast curing adhesive or sealant material is desired. One approach has been to incorporate metallic filler into the adhesive/sealant material. This approach allows for induction heating of the adhesive or sealant material.

The use of metallic fillers for induction heating of adhesives and sealants also poses certain challenges. Efficient heat transfer of induction activated adhesive and sealant materials may require high loading of metallic components. Higher loading of metallic components may result in increased cost. Adhesive and sealant materials with high loading of metallic fillers may also be subject to a variety of processing limitations. Furthermore, some metallic components may be more likely to corrode and/or be abrasive. In addition, induction heating of adhesive and sealant materials including metallic fillers may result in localized polymer scorching.

Thus, there remains a need for improved induction activated adhesive and sealant materials which also allow for high strength adhesion/sealing between two substrates which may be similar or dissimilar substrates. There remains a need for improved heat transfer from the metallic filler to the heat reactive polymer (within the sealant/adhesive) during induction heating of the adhesive or sealant material. There remains a need for induction activated adhesive and sealant materials which are fast curing. There remains a need for induction activated adhesive and sealant materials which allow for lower loading of metallic components in the metallic filler. There remains a need for induction activated adhesive and sealant materials which are suitable for processing via a variety of techniques. There remains a need for induction activated adhesive and sealant materials which are less corrosive and/or are less abrasive. There remains a need for induction activated adhesive and sealant materials which provide for reduced localized polymer scorching. The present teachings provide one or more of the above needs.

SUMMARY

The present teachings include an adhesive/sealant material for induction heating including one or more polymeric materials and dendritic metallic filler. The metallic filler may be present in an amount of at least about 30% by weight of the adhesive/sealant material. The metallic filler may be present in an amount of at least about 50% by weight of the adhesive/sealant material. The adhesive/sealant material may include at least about 20% and less than about 70% by weight of metal.

The metallic filler may be iron. The metallic filler may comprise greater than 40% by weight of the adhesive/sealant material. The metallic filler may be present in an amount of at least about 50% by weight of the adhesive/sealant material. The metallic filler may be present in an amount of at least about 60% by weight of the adhesive/sealant material.

The adhesive/sealant material may have a curing time of less than 3 minutes. The adhesive/sealant material may have a curing time of less than 1 minute. The adhesive/sealant material may have a curing time of less than 30 seconds. The metallic filler may include at least 70% metallic particles having a diameter of less than about 20 µm. The metallic filler may include at least 70% metallic particles having a diameter of less than about 15 µm. The metallic filler may include at least 70% metallic particles having a diameter of less than about 10 µm. The polymeric material may include ethylene and butyl acrylate and is present in an amount of about 10% to about 15% by weight of the adhesive/sealant material.

The adhesive/sealant material may include ethylene vinyl acetate (EVA) copolymer. The adhesive/sealant material may include a hydrocarbon based tackifying resin. The adhesive/sealant material may include about 0.05% to about 0.50% peroxide curing agent. The adhesive/sealant material may include about 0.05% to about 0.50% dibenzoyl peroxide. The adhesive/sealant material may include dipentaerythritol pentaacrylate. The adhesive/sealant material may include about 0.05% to about 1% dipentaerythritol pentaacrylate. The metallic filler may be present in an amount about of 45% to about 55% by weight of the adhesive/sealant material.

The adhesive/sealant material may include from about 1% to about 40% by weight ethylene copolymer. The adhesive/sealant material may include from about 10% to about 20% by weight of a copolymer of ethylene and butyl acrylate. The adhesive/sealant material of any of the preceding claims, including from about 10% to about 15% by weight ethylene vinyl acetate (EVA) copolymer. The adhesive/sealant material may include from about 1% to about 5% by weight reactive elastomeric terpolymer. The adhesive/sealant material may include from about 5% to about 15% by weight hydrocarbon resin. The adhesive/sealant material may include oleic acid amide. The adhesive/sealant material may include less than 2% oleic acid amide. The adhesive/sealant material may include from about 10% to about 15% by weight calcium carbonate. The adhesive/sealant material may include from about 0.50% to about 10% by weight one or more peroxide curing agents. The adhesive/sealant material may include from about 0.5% to about 3% by weight zinc oxide. The adhesive/sealant material may include from about 0.05% to about 1% dipentaerythritol pentaacrylate.

DETAILED DESCRIPTION

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide induction activated adhesive and sealant materials for adhering two substrates. The substrates may be similar or dissimilar substrates. The substrates may be polymeric. The substrates may be metallic. The substrates may be composite materials including multiple materials. The present teachings include an adhesive/sealant material for induction heating including one or more polymeric materials and metallic filler. The metallic filler may be present in an amount of at least about 30% by weight of the adhesive/sealant material.

Any polymeric substrate may include polyamide, a polyolefin (e.g., polyethylene, polypropylene, or otherwise), a polycarbonate, a polyester (e.g., polyethylene terephthalate), an epoxy based material, a thermoplastic polyurethane, or any combination thereof. The polymeric substrate may also include a material that is likely to soften and blend with a corresponding polymer component of the adhesive or sealant.

The adhesive/sealant material will typically include one or more polymers including copolymers and terpolymers which can include a variety of different polymers, such as plastics, thermoplastics, elastomers, thermosets, thermosettables, combinations thereof or the like. For example, and without limitation, polymers that might be appropriately incorporated include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., ethylene vinyl acetate (EVA)), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyimide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate. The adhesive/sealant may include one or more of an acetate (e.g. ethylene vinyl acetate), an acrylate and/or a methacrylate (e.g., a copolymer of butyl acrylate and/or methyl acrylate), and an epoxy/elastomer adduct. For example, and without limitation, the adhesive/sealant may also be an EVA-based material or an ethylene copolymer or terpolymer that may possess an alpha-olefin. As a copolymer or terpolymer, the polymer may be composed of two or three different monomers, i.e., small molecules with high chemical reactivity that are capable of linking up with similar molecules. In one embodiment the adhesive includes an ethylene copolymer, a copolymer of ethylene and butyl acrylate, or some combination thereof. For example, the polymers may comprise about 0.1% to about 50%, about 10% to about 20%, about 25% to about 35%, or about 20% about 40% by weight of the adhesive material.

The metallic filler may be present in an amount of at least about 40% by weight of the adhesive/sealant material. The metallic filler may be present in an amount of at least about 50% by weight of the adhesive/sealant material. The metallic filler may be present in an amount of at least about 60% by weight of the adhesive/sealant material. The metallic filler may be present in an amount of at least about 70% by weight of the adhesive/sealant material.

The adhesive/sealant may be a material layer. The material layer may be formed as a mesh. For example, the mesh layer may be formed having a plurality of repeating generally diamond shaped, rectangular, circular or square openings. The adhesive/sealant material may flexible. For example, the adhesive/sealant material may be pliable enough to be arranged in direct planar contact with a contoured surface.

The present teachings provide for an adhesive/sealant material. The adhesive/sealant material may be an activatable material. The activatable material may be a foamable material (e.g., an expandable material). The adhesive or sealant may foam, cure or any combination thereof, upon exposure to a stimulus. Such stimuli may include heat (which may be applied by induction heating), light, electricity, pressure, cooling, moisture and the like. Curing, as used herein, generally denotes any stiffening, hardening, solidifying or the like of the adhesive or sealant material. The requisite stimulus can be applied to a selected area of the adhesive or sealant, the substrate, or any combination thereof. For example, the stimulus can be selectively applied to a small area on the substrate that is in contact with a portion of the adhesive or sealant.

The adhesive or sealant material may be heated by induction heating. In one example, a magnetic field at a frequency range may be applied to one or more of the adhesive/sealant or the substrate. The frequency range may be between 60-150 kHz, or even between 80-100 kHz). The magnetic field may act to heat the materials by induction heating. The stimulus may be applied to a substrate, or the adhesive/sealant material. Most of the heat generating eddy currents may be on the surface of the electromagnetic particles of the metallic filler. For example, the electromagnetic particles may include "fern-like" particles (e.g., may be dendritic in shape). The fern-like particles may be comprised of pure iron.

The induction heated adhesive/sealant material may have a faster curing time as compared to a paint bake oven. For example, the curing time in a paint bake oven may be about 8 minutes. The adhesive/sealant material of the present teachings has a cure time of less than 8 minutes. The adhesive/sealant material may have a curing time of less than 5 minutes. The adhesive/sealant material may have a curing time of less than 3 minutes. The adhesive/sealant material may have a curing time of less than 1 minute. The adhesive/sealant material may have a curing time of less than 30 seconds. The adhesive/sealant material may have a curing time of about 20 seconds to about 60 seconds. The adhesive/sealant material may have a curing time of about 20 seconds to about 40 seconds. The adhesive/sealant material may have a curing time of about 25 seconds.

One or more of the adhesive/sealant material or a substrate may include a metallic filler material that assists in heating the adhesive/sealant material. The metallic filler may allow for the adhesive/sealant material to magnetically adhere to a metallic surface prior to activation. The metallic filler may include iron. The metallic filler may include one or more iron alloys. The metallic filler may include one or any combination of nickel, ferrite, zinc, manganese, or iron.

The metallic filler may include pure iron. Pure iron is less subject to corrosion than other materials (e.g. steel). As such, the adhesive/sealant material of the present teachings may be less susceptible to corrosion. Pure iron is also less abrasive. As such, the adhesive/sealant material of the present teachings may be more suitable for processing with a variety of techniques and/or tools. The present teachings provide for induction activated adhesive and sealant materials which are suitable for processing via a variety of techniques. The techniques may include any of the following: mixing, pelletizing, extruding, pultruding and molding.

The metallic filler includes metallic components. The metallic filler may include iron. The metallic filler may include metal powder. The metallic filler may include an electrolytic iron powder. The metallic filler may include iron particles. The metallic filler may be of a fern-like (e.g., dendritic) shape. The metallic particles may be encapsulated. The metallic filler may include dendritic iron.

For example, the metallic particle size (e.g., a particle diameter) may be anywhere from about 0.001 µm to about 20 µm (e.g., the average particle size). The metallic particle size may be less than 20 µm (e.g., at least about 50% or even at least about 70% of the metallic particles may be less than 20 µm). The average metallic particle size may be less than 10 µm. The average metallic particle size may be about 1 µm. The average metallic particle size may be from about 5 nm to about 50 nm. The average metallic particle size may be about 50 µm. The average metallic particle size may be about 5 nm. The metallic particles may be encapsulated. It is contemplated that the metallic filler including dendritic iron possesses superior thermal conductivity. Heat passes through and spreads quickly in the adhesive or sealant material applied to one or more substrates.

The present teachings provide for improved heat transfer from the metallic filler to the heat reactive polymeric material within the adhesive/sealant during induction heating of the adhesive or sealant material. It is contemplated that the adhesive/sealant material of the present teachings may provide for efficient heat transfer from encapsulated fern-like metallic particles to a heat reactive polymer matrix. The efficient heat transfer may be due to the increased surface area of the metallic particles. It is contemplated that the increased surface area may also improve the efficiency of the electromagnetic particles allowing for a lower loading level than other particle shapes (e.g. aggregates, spheres, etc.).

It is contemplated that the metallic filler comprises a significant portion of the adhesive/sealant material by weight. The metallic filler may be present in an amount of at least 30% by weight of the total adhesive/sealant material. The metallic filler may be present in an amount of at least 40% by weight of the total adhesive/sealant material. The metallic filler may be present in an amount of at least 50% by weight of the total adhesive/sealant material. The metallic filler may be present in an amount of at least 60% by weight of the total adhesive/sealant material. The metallic filler may be present in an amount of at least 70% by weight of the total adhesive/sealant material.

The present teachings provide for induction activated adhesive and sealant materials which allow for lower loading of metallic components. For example, the present teachings provide for adhesive/sealant material that allows for lower loading of the metallic particles in the filler.

The adhesive/sealant material may also include an adhesion promoter, including but not limited to epoxy materials, acrylates, hydrocarbon resins or the like. The adhesion promotor may be present in an amount of at least about 2% by weight, at least about 5% by weight or even at least about 9% by weight. The adhesion promotor may be present in an amount of less than about 20% by weight, less than about 15% by weight or less than about 10% by weight.

One or more curing agents and/or curing agent accelerators may be added to the adhesive or sealant material. Amounts of curing agents and curing agent accelerators can vary widely within the material composition depending upon the type of cellular structure desired, the desired amount of expansion of the material (if any), the desired rate of expansion, the desired structural properties of the adhesive or sealant material, the desired cure conditions (e.g., manufacturing conditions) and the like. An exemplary range for the curing agents or curing agent accelerators present in the material composition may range from about 0.01% to about 20% by weight.

Examples of suitable curing agents include peroxide curing and/or crosslinking agents. Other suitable curing agents may include materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), or mixtures thereof. Particular curing agents include modified and unmodified polyamines or polyamides such as triethylenetetramine, diethylenetriamine tetraethylenepentamine, cyanoguanidine, dicyandiamides and the like. Another possible curing agent is dihydrazides, particularly isophthalic dihydrazide.

An accelerator for the curing agents may also be provided for preparing the adhesive. Exemplary accelerators for the curing agents might include a modified or unmodified urea such as methylene diphenyl bis urea, an imidazole, a tertiary amine, a combination thereof or the like. Another possible accelerator for curing agents is dipentaerythritol pentaacrylate.

One or more blowing agents may be added to the adhesive material for producing inert gasses that form, as desired, an open and/or closed cellular structure within the activatable material. In this manner, it may be possible to lower the density of articles fabricated from the material. The blowing agent may include one or more nitrogen containing groups such as amides, amines and the like. Examples of suitable blowing agents include azodicarbonamide, dinitrosopentamethylenetetramine, 4,4.sub.i-oxy-bis-(benzenesulphonylhydrazide), trihydrazinotriazine and N,N.sub.i-dimethyl-N,N.sub.i-dinitrosoterephthalamide.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified ureas.

For example, the adhesive/sealant material may include dicyandiamide and a reactive elastomeric terpolymer. The dicyandiamide may be present in about 0.01% to about 0.30% by weight. The reactive elastomeric terpolymer may be present in about 1% to about 5% by weight. The dicyandiamide may serve to cure reactive elastomeric terpolymer. The dicyandiamide may also serve as a very strong activator for a blowing agent. For example, the blowing agent be azodicarbonamide.

The adhesive/sealant material may include one or more non-metallic fillers. Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed. Silicate minerals such as mica may be used as fillers. In one embodiment, one or more mineral or stone type fillers such as calcium carbonate, sodium carbonate or the like may be used as fillers.

The adhesive/sealant material may include copolymer of ethylene and butyl acrylate. The adhesive/sealant material may include ethylene vinyl acetate (EVA) copolymer. The adhesive/sealant material may include reactive elastomeric terpolymer. The adhesive/sealant material may include a hydrocarbon resin. The adhesive/sealant material may include oleic acid amide. The adhesive/sealant material may include calcium carbonate. The adhesive/sealant material may include one or more peroxide curing agents. The adhesive/sealant material may include zinc oxide. The adhesive/sealant material may include dicyandiamide. The adhesive/sealant material may include carbon black. The adhesive/sealant material may include azodicarbonamide. The adhesive/sealant material dipentaerythritol pentaacrylate.

The copolymer of ethylene and butyl acrylate may be present in an amount of about 10% to about 15% by weight of the adhesive/sealant material. The adhesive/sealant material may include about 0.05% to about 0.50% peroxide curing agent. The adhesive/sealant material may include about 0.05% to about 0.50% dibenzoyl peroxide. For example, the adhesive material may include 0.2% by weight dibenzoyl peroxide. The adhesive/sealant material may include about 0.05% to about 1% dipentaerythritol pentaacrylate. The metallic filler may be present in an amount about of 45% to about 55% by weight of the adhesive/sealant material.

The adhesive/sealant material may include one or more additives (e.g., functional additives) for improving one or more various properties of the composition. As examples, additives may include antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids and stabilizers and combinations thereof or the like.

The adhesive sealant material may include the following: about 10% to about 20% by weight copolymer of ethylene and butyl acrylate; about 10% to about 15% by weight ethylene vinyl acetate (EVA) copolymer; about 1% to about 5% by weight reactive elastomeric terpolymer; about 5% to about 15% by weight hydrocarbon resin; less than 2% oleic acid amide; about 10% to about 15% by weight calcium carbonate; about 0.10% to about 10% by weight peroxide curing agents; about 0.50% to about 3% by weight zinc oxide; about 0.01% to about 0.30% by weight dicyandiamide; about 0.01% to about 1% carbon black; about 1% to about 7% by weight azodicarbonamide; about 0.05% to about 1% dipentaerythritol pentaacrylate; and the metallic filler may include about 10% to about 15% by volume iron and may be present in an amount of about 50% by weight of the adhesive/sealant material.

In one embodiment, the induction activatable adhesive/sealant material includes copolymer of ethylene and butyl acrylate; ethylene vinyl acetate (EVA copolymer); reactive elastomeric terpolymer; hydrocarbon resin; calcium carbonate; peroxide curing agents; zinc oxide; dicyandiamide; carbon black; azodicarbonamide; dipentaerythritol pentaacrylate; and metallic filler including iron particles. The metallic filler may include about 10% to about 15% by volume iron and may be present in an amount of about 50% by weight of the adhesive/sealant material. In addition, the embodiment may include a polymer additive such as oleic acid amide.

A non-limiting example of the adhesive/sealant material formulation of the present teachings is provided below in Table 1. All parts and percentages are by weight unless otherwise indicated.

TABLE 1

| Component | Ex 1 |
| --- | --- |
| copolymer of ethylene and butyl acrylate | 14.34 |
| ethylene vinyl acetate (EVA) copolymer | 11.38 |
| reactive elastomeric terpolymer | 3.54 |
| hydrocarbon resin | 7.91 |
| oleic acid amide | 0.60 |
| calcium carbonate | 7.57 |
| iron filler including about 10% to about 15% by volume iron | 50.0 |
| peroxide curing agent A | 0.90 |
| peroxide curing agent B | 0.20 |
| zinc oxide | 1.49 |
| dicyandiamide | 0.06 |
| carbon black | 0.05 |
| azodicarbonamide | 1.46 |
| dipentaerythritol pentaacrylate | 0.50 |

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. An adhesive/sealant material for induction heating comprising:
    one or more polymers including an ethylene copolymer; and
    a metallic filler that is dendritic in shape;
    wherein the material is formed as a mesh, and is capable of being heated by the induction heating with a magnetic field frequency of 80 to 100 kHz, and also includes at least about 20% and less than about 70% by weight of metal.

2. The adhesive/sealant material of claim 1, wherein the metallic filler is iron.

3. The adhesive/sealant material of claim 1, wherein the metallic filler comprises greater than 40% by weight of the adhesive/sealant material.

4. The adhesive/sealant material of claim 1, wherein the adhesive/sealant material has a curing time of less than 3 minutes at said magnetic field frequency.

5. The adhesive/sealant material of claim 1, wherein the adhesive/sealant material has a curing time of less than 1 minute at said magnetic frequency.

6. The adhesive/sealant material of claim 2, wherein the metallic filler includes at least 70% metallic particles having a diameter of less than about 20 µm.

7. The adhesive/sealant material of claim 2, wherein the metallic filler includes at least 70% metallic particles having a diameter of less than about 15 µm.

8. The adhesive/sealant material of claim 1, wherein the polymeric material includes ethylene and butyl acrylate and is present in an amount of about 10% to about 15% by weight of the adhesive/sealant material.

9. The adhesive/sealant material of claim 1, wherein the adhesive sealant material includes ethylene vinyl acetate (EVA) copolymer.

10. The adhesive/sealant material of claim 6, wherein the adhesive/sealant material includes a hydrocarbon based tackifying resin.

11. The adhesive/sealant material of claim 6, wherein the adhesive/sealant material includes about 0.01% to about 5% peroxide curing agent.

12. The adhesive/sealant material of claim 1, wherein the adhesive/sealant material includes about 0.05% to about 0.50% dibenzoyl peroxide.

13. The adhesive/sealant material of claim 2, wherein the adhesive/sealant material includes dipentaerythritol pentaacrylate.

14. The adhesive/sealant material of claim 1, wherein the adhesive/sealant material includes about 0.05% to about 1% dipentaerythritol pentaacrylate.

15. The adhesive/sealant material of claim 1, wherein the metallic filler includes about 10% to about 15% by volume iron and is present in an amount about of 45% to about 55% by weight of the adhesive/sealant material.

16. The adhesive/sealant material of claim 15, including from about 10% to about 20% by weight ethylene copolymer.

17. The adhesive/sealant material of claim 1, including from about 10% to about 20% by weight of a copolymer of ethylene and butyl acrylate.

18. The adhesive/sealant material of claim 1, including from about 10% to about 15% by weight ethylene vinyl acetate (EVA) copolymer.

19. The adhesive/sealant material of claim 1, including from about 1% to about 5% by weight reactive elastomeric terpolymer.

20. The adhesive/sealant material of claim 15, including from about 0.5% to about 3% by weight zinc oxide.

\* \* \* \* \*